[11] 3,611,292

| [72] | Inventors | William F. Brown<br>Wappingers Falls;<br>Ronald J. Goetchius, Fishkill; Jerry L.<br>Nolting, Fishkill; Alan D. Rouse, Pawling,<br>all of N.Y. |
|---|---|---|
| [21] | Appl. No. | 826,630 |
| [22] | Filed | May 21, 1969 |
| [45] | Patented | Oct. 5, 1971 |
| [73] | Assignee | Texaco Inc.<br>New York, N.Y. |

[54] CREDIT CARD VALIDATION SYSTEM
2 Claims, 12 Drawing Figs.

[52] U.S. Cl. .................................................. 340/149 R,
  235/61.7 B, 235/61.11 E, 340/149 A
[51] Int. Cl. ...................................................... H04q 9/00
[50] Field of Search............................................ 340/149;
  235/61.11, 61.11 S, 61.7

[56] References Cited
UNITED STATES PATENTS

| 2,131,911 | 10/1938 | Ayres ........................ | 340/149 A |
| 3,025,495 | 3/1962 | Endres ...................... | 235/61.11 X |
| 3,243,776 | 3/1966 | Abbott, Jr. et al. .......... | 235/61.11 X |
| 3,401,830 | 9/1968 | Mathews .................... | 235/61.7 B |

OTHER REFERENCES

"Character Recognition by Automatic Comparison" N. G. Smeltzer, IBM Publication Vol. 7 No. 10 Mar. 1965 p. 937 (Copy in 340/149)

*Primary Examiner*—Donald J. Yusko
*Attorneys*—K. E. Kavanagh, Thomas H. Whaley and Robert J. Sanders

ABSTRACT: A credit card bearing a plurality of embossed decimal digits identifying an account number is inserted in a novel card holder which ensures accurate optical alignment or registration for character recognition purposes. The holder and the credit card contained therein are illuminated and as the holder is moved past a lens each digit is optically read one at a time; i.e. light reflected from the face of the card is directed through the lens and to a mask having a unique pattern of holes therethrough. Photodetectors associated with the mask translate reflected light passing through the holes into electrical signals representative of the card's account number. These signals are ultimately encoded in binary form and delivered to a comparator to determine whether the binary-coded account number corresponds to a like binary-coded number stored in a suitable storage means.

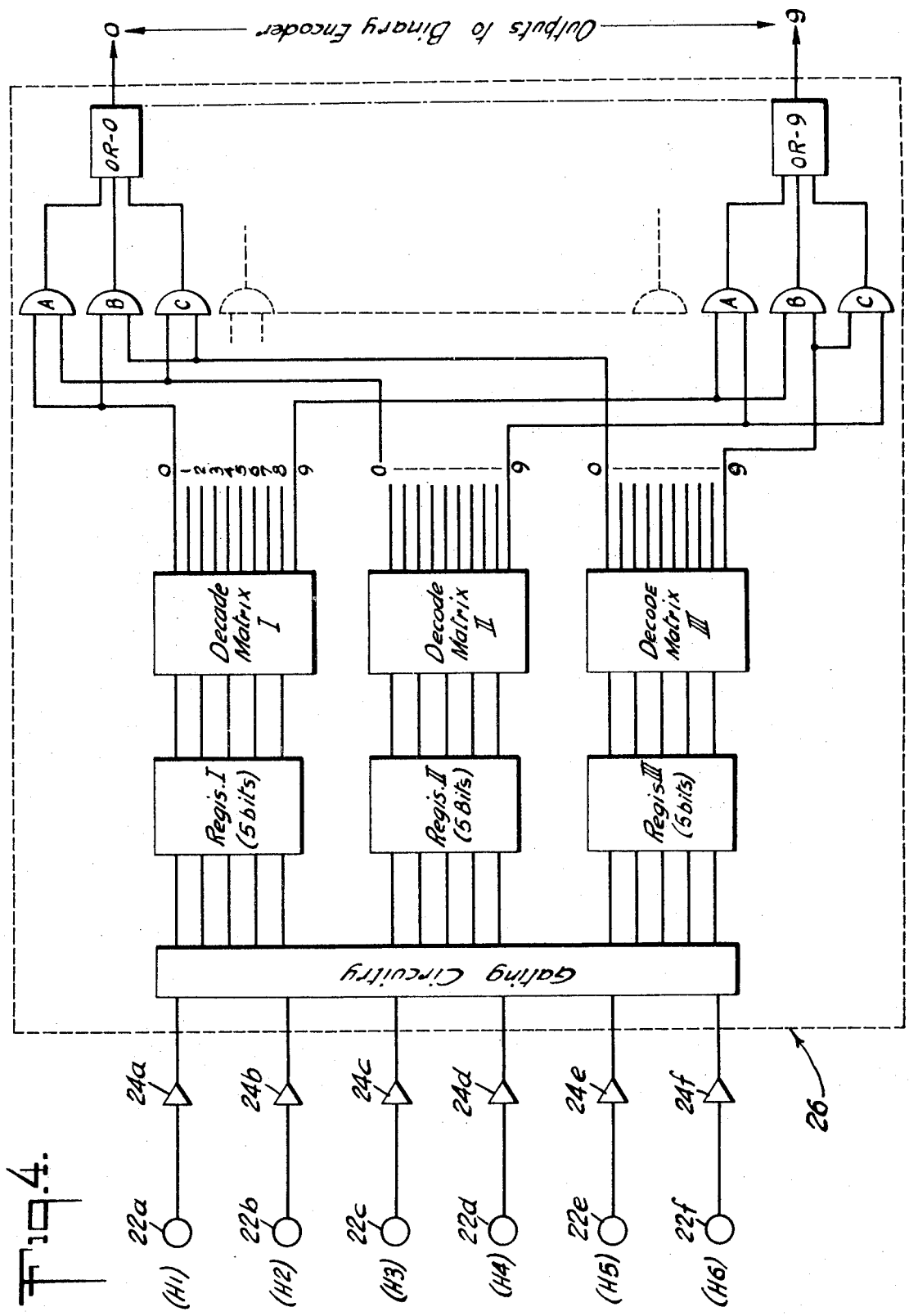

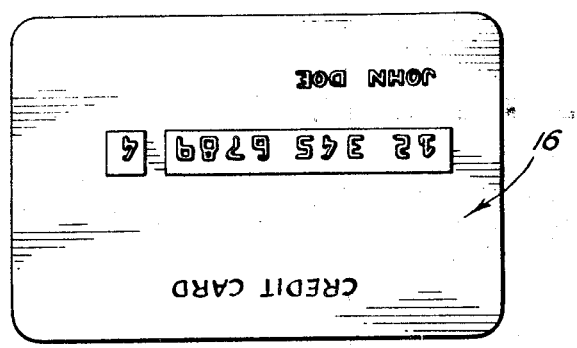
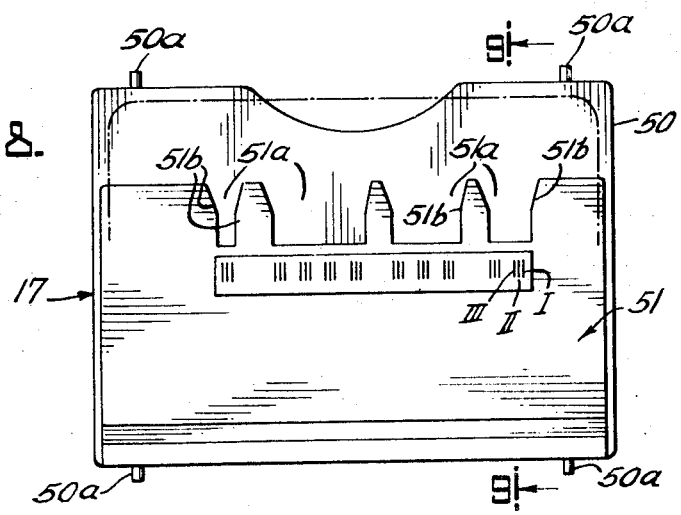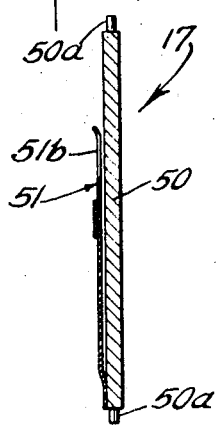
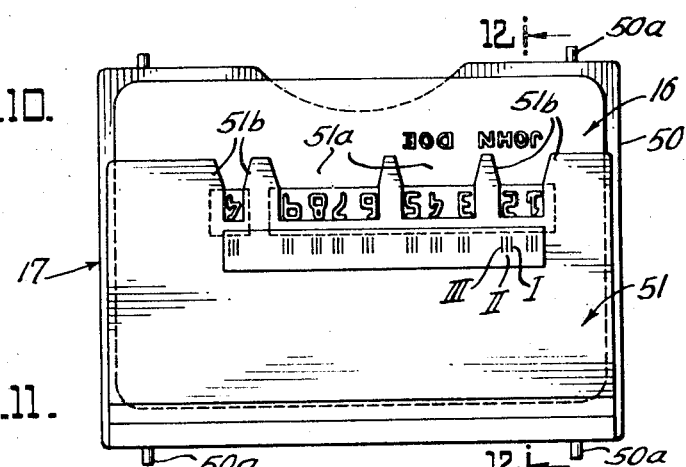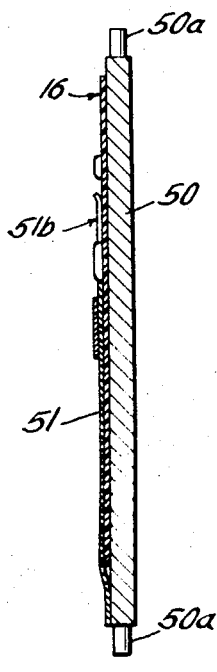
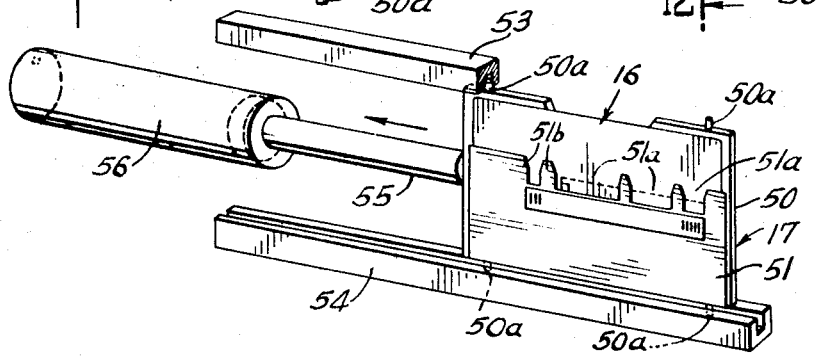

CREDIT CARD VALIDATION SYSTEM

BACKGROUND OF THE INVENTION

This invention pertains, generally, to character recognition apparatus; and, more particularly, to optically reading embossed characters or numbers on such articles as credit cards and the like.

Although the invention is hereinafter described and illustrated in the accompanying drawing figures as being useful in optically reading an account number embossed on a credit card it is to be understood that the invention's use is not limited to the optical reading of credit card numbers. Nor is the invention limited to numbers which are embossed or otherwise depressed or raised, although the invention has particular advantages when used for the optical reading of embossed account numbers.

One widely used form of credit card construction is the relatively thin plastic card which measures about 2-⅛ inches by 3-⅜ inches. The card bears an account number (e.g. 10 decimal digits) which is embossed into the card's surface by means of a suitable die. The embossing operation raises the digits upwardly on one face of the card and on the reverse face thereof the embossed digits create a corresponding cavity or depression. Usually, there is a substantial amount of printed matter on either or both faces of the card. Very often a substantial amount of printed matter appears on the reverse face of the card and this printed matter overlays the embossed characters, or numbers.

The credit card hereinbefore generally described is not entirely satisfactory for some methods for character recognition or reading. For example, in the mechanic sensing system of reading the embossed digits, or embossed marks representing digits, on the card face two difficulties present themselves: (1) accumulation of dirt; and (2) distortion of the digits as occurs when the credit card is processed through an imprinter for making a receipt or invoice. The accumulation of dirt on and around the embossed digits or characters often interferes with the correct recognition of one or more of the digits and, hence, a false reading results. Distortion or flattening or spreading of the embossed digits caused by repeated processing through an imprinter similarly interferes with correct recognition and, again, false readings result.

SUMMARY OF THE INVENTION

One object of the invention is to correctly identify characters for, among other purposes, credit validation.

Another object of the invention is to optically read account numbers, such as decimal digits, on an article such as a credit card.

Another object of the invention is to employ reflected light or the absence or diminished intensity thereof to optically read account numbers such as decimal digits on an article such as a credit card.

Another object of the invention is to achieve the foregoing objects with respect to credit cards of the kind hereinbefore generally described which have account numbers such as in the form of decimal digits which are embossed in said article or credit card.

In accordance with an illustrative embodiment of the invention there is provided methodology and apparatus for reading the digits embossed on a credit card for the purpose, among others, of determining whether because stored financial history the card ought to be honored. Suffice it to say that the card is illuminated and light is reflected from the illuminated face of the card. Each digit or character location on the card is comprised of an embossed portion representing the digit or character as well as a flat or plane portion. The plane portion reflects light impinging thereon while the embossed portion (the digit or character) can be considered to do either of two things: (1) reflect no light at all or (2) reflect light which is diminished in intensity. It makes no difference conceptually. The important aspect is that there is a detectable difference between light reflected from the embossed and the nonembossed, or flat, portions of the credit card.

It is to be understood that if hereinafter it is stated that diminished light, darker light or recitations to like effect are employed such terminology is meant to include also the absence of light. The light reflected from the embossed and nonembossed portions of the credit card are directed through a suitable lens system and projected onto a mask. The credit card having the embossed digits representing the account number thereon is inserted in a novel holder. The holder, as will be appreciated from the detailed description hereinafter, serves: (1) to maintain accurate optical alignment or registration of the digits; and (2) to transport the card past a focusing lens so that the digits may be read one at a time; i.e., reflected light from each digit is focused or projected onto the mask. The mask includes an array of apertures or holes which permit the reflected light to illuminate some photodetectors associated with the holes in said array and not illuminate other photodetectors associated with other holes in said array. Each digit is read at three different positions by the same hole array and associated photodetectors. The illuminated and nonilluminated photodetectors are instrumental in generating sets of electrical signals which are representative of the light projected from the particular digits to be recognized or read. Sets of such signals representing all the digits of the card's account number are ultimately transferred to a comparator unit which compares the card's digits with digits stored in a suitable memory unit in order to establish whether a like set of digits representing a particular account number exists in the memory unit.

If, for example, delinquent account numbers are stored in the memory unit and one such number corresponds with the number on the credit card then appropriate action may be taken.

One feature among others of the invention is the employment of a novel credit card holder which is especially advantageous for the use with credit cards having account numbers embossed therein. The holder serves the two purposes hereinbefore set forth.

Another feature of the invention resides in reading each decimal digit at three different positions and thus obtaining three sets of signals.

Another feature of the invention resides in the logic employed to minimize error in identifying the decimal digits being read. In this respect the aforesaid three sets of signals are processed in such manner that if two of the three sets of signals are in agreement then a signal or signals representative of the decimal digit being read is delivered ultimately to a comparator for credit verification.

Other objects as well as the various features and advantages of the invention are set forth hereinafter where specific illustrative embodiments of the various features of the invention are set forth and described in detail with reference to the accompanying drawing figures.

BRIEF DESCRIPTION OF THE DRAWING

FIG. 4 is a block diagram showing, among other things, the logic circuitry employed for determining each digit of the credit card identification or account number.

FIG. 7 shows the credit card upside down, as it is to be placed in a holder for the credit card.

FIG. 8 is a frontal view of the card holder.

FIG. 9 is a cross section view of the holder taken on section line 9—9' in.

FIG. 10 shows the card inserted in the card holder.

FIG. 11 show the card carrying card holder as arranged for sliding motion.

FIG. 12 shows a cross section view through section line 12—12 of FIG. 10.

DESCRIPTION OF THE PREFERRED EMBODIMENT

Figure 1:
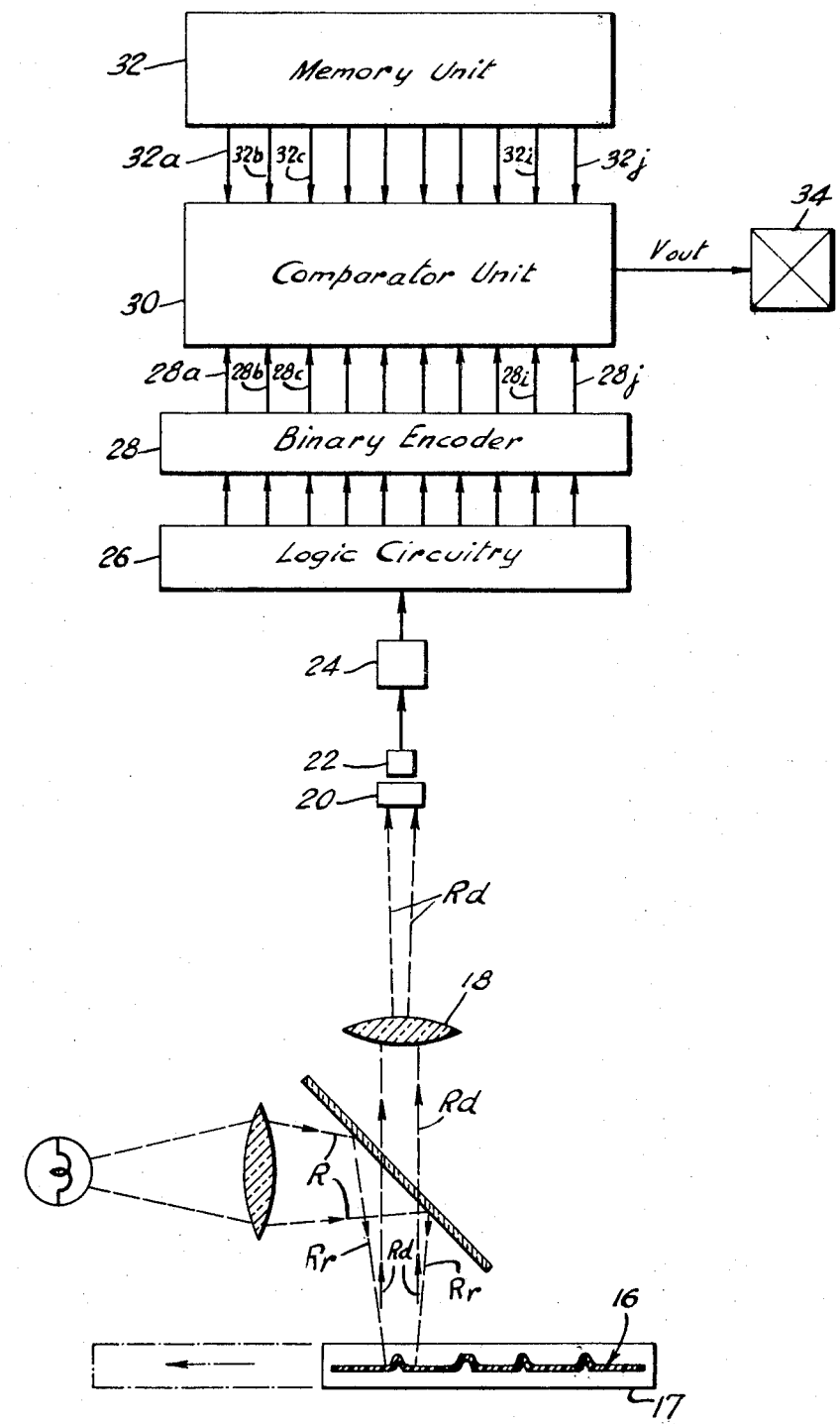
FIG. 1 is a diagrammatic illustration including block diagrams of the overall system according to the invention.

In FIG. 1 there is shown a light source 10 which may be a conventional low-voltage filament-type bulb. Light represented symbolically by the rays R is directed through a lens 12 which, as indicated, refracts and directs the rays R onto the face of a reflecting medium 14 which in turn transmits light. The medium 14 may, for example, be a small piece of transparent window glass arranged at a 45° angle with respect to a plane of a credit card 16, as suggested in FIG. 1 so that the rays can be redirected to the face of the credit card. In FIG. 1 credit card 16 is illustrated diagrammatically as being mounted in a slidable credit card holder 17. Also, as shown in FIG. 1, the rays $R_r$ are redirected by reflection from the glass plate 14 to that area of the face of the card 16 which includes the raised embossed decimal digits representing the identification or account number. For details of the credit card 16 see FIGS. 2 and 3. The redirected rays $R_r$ are reflected from the card's face backwardly and these reflected rays symbolically illustrated in FIG. 1 are identified as the light rays R. The rays $R_d$ are, as indicated, reflected toward the glass 14, which being transparent allows the rays $R_d$ to be transmitted to another lens 18.

Lens 18, as indicated in FIG. 1, collimates or focuses the light rays $R_d$ in such a way that they are directed to a face of a mask 20 (see FIG. 6 for details of mask) and cover a specific area on the face of the mask 20. This aspect is discussed in more detail hereinafter with reference to the discussion respecting FIGS. 5 and 6. Suffice it to say at this point that mask 20 has six vertically aligned apertures $H_1$ through $H_6$ therein. These six apertures serve, in the manner hereinafter disclosed, the purpose of enabling recognition of each of the 10 decimal digits embossed on the face of credit card 16.

Lens 18 and mask 20 are located at opposing ends of a light tight box (not shown in FIG. 1) so that ambient light will not interfere with character recognition.

As indicated in FIG. 1, in back of the apertured mask 20 there is positioned a plurality of photodetector cells 22. Six photodetector cells 22 are employed in the manner hereinafter discussed. While many different kinds or types of photodetectors may be employed the type herein contemplated for purposes of illustration is the photoconductive device; e.g., a cadmium sulfide cell which has a very high resistance in the absence of, or low intensity, light and relatively low resistance in the presence of light or higher intensity light levels.

Figure 5:
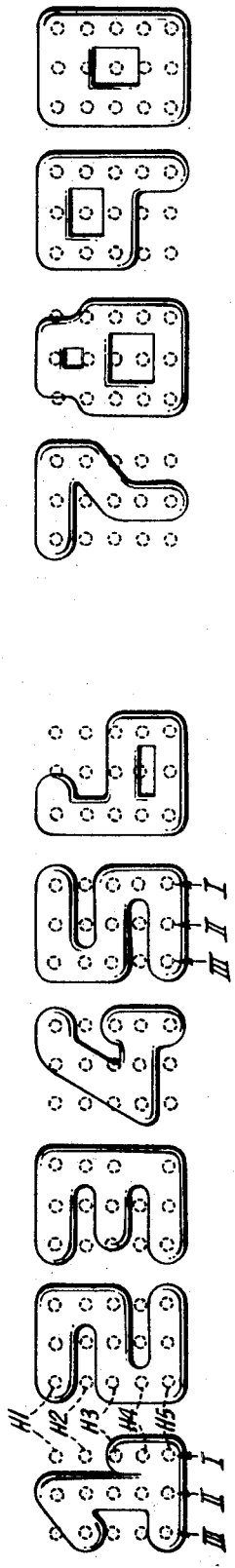
FIG. 5 is an illustration of the font employed for the decimal digits 0 through 9 and also shown in superimposed relation on each digit is a pattern or array of apertures or holes in a mask on which reflected light is projected.

It has been discovered that the particular vertical arrangement of apertures or holes in the mask 20 enables recognition of all of the 10 decimal digits 1, 2, 3, 4, 5, 6, 7, 8, 9 and 0, which have the form or font shown in FIG. 5. As an illustrative example used herein such font has been chosen for the instant example as the type font identified as IBM 1428 font. However, the instant invention does not necessarily depend on the use of the aforementioned font. The general principle of the invention obtains in respect of recognizing or reading digits of any form or font on the credit card.

Figure 6:
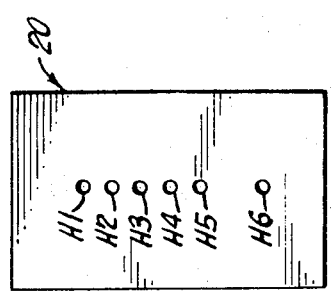
FIG. 6 is a view of the mask employed for identifying the digits.

As indicated at FIG. 6 the six holes in mask 20 are identified as holes $H_1$, $H_2$, $H_3$, $H_4$, $H_5$ and $H_6$. In back of each of the holes $H_1$ through $H_6$ in mask 20 there is located a separate photodetector unit. In FIG. 4 these photodetector units are identified by the reference characters 22a, 22b, 22c, 22d, 22e and 22f. As shown in FIG. 1 the array of photodetector units 22 is directly coupled to the input of an array of amplifiers which are generally designated by the reference No. 24. As indicated in FIG. 4 for each of the photodetector units 22a through 22f there is provided a separate amplifier unit. These amplifiers are identified in FIG. 4 as the amplifier units 24a, 24b, 24c, 24d, 24e, and 24f.

As shown each photodetector array being coupled through the amplifier units generate suitable signals (hereinafter specifically discussed) which from the amplifier units 24 are fed to logic circuitry 26 which, as is more fully explained with reference to FIG. 4, processes the aforesaid signals and decodes said signals for the purpose of determining which one of the decimal digits 0 through 9 is being read or recognized by the optical system. From the decoding logic circuitry 26 theses signals are routed to a binary encoder 28 which encodes the output signals from the logic circuitry unit 26 into binary signals. From the binary encoder unit 28 binary encoded signals are delivered via the paths 28a through 28j, as indicated in FIG. 1, to a comparator unit 30. Each of the paths 28a through 28j represents four channels for providing four binary signals representing four binary bits for the decimal number 0 through 9. Thus, for a credit card account number having 10 decimal digits 40 binary digits, or bits, are delivered to a suitable register having at least 40 bit locations situated in the comparator unit 30.

Also as illustrated in FIG. 1 there is provided a memory unit 32 which includes suitable storage means for storing at least 40 binary digits or its for each account number which is considered to be a delinquent account signifying a poor credit risk. As shown in FIG. 1 the 40 binary digits or bits representative of a particular account number are delivered by way of the paths 32a through 32j from a memory unit 32 to the comparator unit 30. If all the bits delivered from the binary encoder 20a correspond to all the bits from the memory unit 32 then the comparator 30 delivers an output signal identified as $V_{out}$. The signal $V_{out}$ may be used to drive a visible or audible alarm 34.

Figure 3:
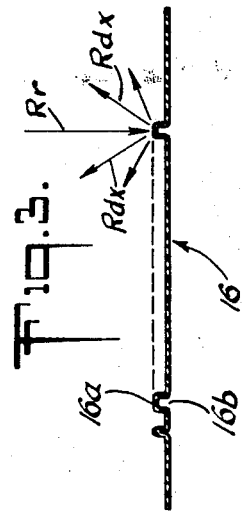
FIG. 3 is a cross section view taken through the credit card shown in FIG. 2 and taken along the section line 3—3' therein.
Figure 2:
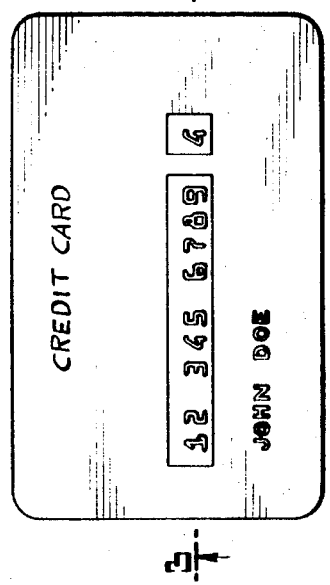
FIG. 2 is a frontal view of a typical credit card having an account number among other things embossed thereon.

Shown at FIGS. 2 and 3 of the drawings are illustrations of the kind of credit card herein employed. In FIG. 2 the front face of the credit card 16 is shown and the decimal digits representing the account number appear thereon as indicated. The decimal digits representing the account number are embossed in the card and in the view shown in FIG. 2 the embossed decimal digits protrude outwardly toward the observer. FIG. 3 which is a cross section through the credit card shown in FIG. 2 illustrates the foregoing more clearly. For example, as shown in FIG. 3 the embossed decimal digits are comprised of a raised portion 16a on the front face of the card and a corresponding cavity 16b on the reverse side of the card.

Also as indicated in FIG. 3 when the reflected rays $R_r$ of light impinge upon the embossed or raised portions 16a of the card 16 the reflected or redirected light rays $R_{dx}$ are diffused in the manner suggested in FIG. 3. As a result the reflected rays $R_{dx}$ return vary little or no light back to the transparent medium 14 (see FIG. 1). By contrast, as indicated in FIG. 1, the rays $R_d$ which are returned from the nonembossed face of the card 16 are returned in greater quantity and ultimately are returned through the collimating lens 18 to the mask 20.

At FIG. 5 there is shown the type font employed for the 10 decimal digits 1, 2, 3, 4, 5, 6, 7, 8, 9 and 0. As stated hereinbefore the type font employed herein is identified as IBM 1428 font.

In FIG. 5 there is shown superimposed on each of the aforementioned decimal digits 15 (3 sets of 5) circles which are representative of the five holes H1 through H5 in the mask 20 shown in FIG. 6. The three vertical sets of circles of five circles each shown in FIG. 5 on each of the digits is representative of the fact that each digit is read through the holes H1 through H5 in mask 20 at the three locations indicated. (See FIG. 5 where the three reading or index locations or lines are identified by the numerals I, II, and III). This will be explained in more detail hereinafter with reference to the purpose of hole H6 in mask 20 and to the discussion of the card holder 17. It is to be noted that for each of the 10 decimal digits the five hole pattern (holes H1 through H5) is uniquely imposed on each of the digits at the three locations I, II, and III. In each 15 (3 by 5) hole pattern one or more of the holes may register on the font representing the digit or one, or more, of the holes may lie outside of the font representing the digit. To illustrate this uniqueness more clearly each hole in the five hole pattern H1 through H5 (see FIG. 6) is identified as the holes H1, H2, H3, H4 and H5. In table I, hereinafter set forth, if hole H1, for example, lies in super position on the type font in any of the registry lines, I, II, or III, it is identified by the numeral 1. If, on the other hand, it lies outside of the type font it is represented by $\bar{1}$. The same is true for the holes H2, H3, H4, and H5. Of course it is to be understood that when any of the holes H1 through H5 lies on the type font shown in FIG. 5 it is in the shadow of the projected image of the digit. If, however, the particular hole lies outside the type font it is outside of the shadow area. For example, in FIG. 5 in digit 1 hole H1 line I lies in the light area rather than in the dark area, whereas hole H5 lies in the dark area. Hence, hole H1 would be represented by $\bar{1}$ whereas hole H5 would be represented in table I by 5. The foregoing will become clear by referring to table I, hereinafter appearing.

digit one. In registration position I, which is detected through hole H6 by the photodetector 22f, the signals detected by the photodetectors 22a through 22e which are in registrations with holes H1 through H5 ultimately deliver through the amplifiers 24a through 24e, respectively, to the gating circuitry the signal sequence hereinbefore discussed in table I as follows: $\bar{1}, \bar{2}$, 3, 4 and 5. The output from the amplifier 24f drives the gating circuitry 40 such that register I is initially filled with the five bits represented by the signals $\bar{1}, \bar{2}$, 3, 4, and 5. Next, as the card is moved to registration position II the photodetector 22f and amplifier 24f, associated with hole H6, set up the gating circuitry 40 such that the register II is filled with the signals (table I) 1, 2, 3, 4 and 5, which are generated by the photodetectors 22a through 22e. Finally, as the decimal digit one on credit card 16 is lined up with mask 20 at registration position III the gating circuitry 40 routes signals represented in table I to the register III. These signals, in sequence, are $\bar{1}$, 2,

TABLE I

| | Index line | | | | | | | | | | | | | |
|---|---|---|---|---|---|---|---|---|---|---|---|---|---|---|
| | I | | | | | II | | | | | III | | | | |
| | H1 | H2 | H3 | H4 | H5 | H1 | H2 | H3 | H4 | H5 | H1 | H2 | H3 | H4 | H5 |
| Decimal digit: | | | | | | | | | | | | | | | |
| 1 | $\bar{1}$ | $\bar{2}$ | 3 | 4 | 5 | 1 | 2 | 3 | 4 | 5 | $\bar{1}$ | 2 | $\bar{3}$ | $\bar{4}$ | 5 |
| 2 | 1 | 2 | 3 | $\bar{4}$ | 5 | 1 | $\bar{2}$ | 3 | $\bar{4}$ | 5 | 1 | 2 | 3 | 4 | 5 |
| 3 | 1 | 2 | 3 | 4 | 5 | 1 | 2 | 3 | $\bar{4}$ | 5 | 1 | $\bar{2}$ | $\bar{3}$ | $\bar{4}$ | 5 |
| 4 | 1 | $\bar{2}$ | 3 | 4 | 5 | 1 | 2 | 3 | 4 | $\bar{5}$ | $\bar{1}$ | $\bar{2}$ | 3 | 4 | $\bar{5}$ |
| 5 | 1 | $\bar{2}$ | 3 | 4 | 5 | 1 | $\bar{2}$ | 3 | $\bar{4}$ | 5 | 1 | 2 | 3 | $\bar{4}$ | 5 |
| 6 | $\bar{1}$ | $\bar{2}$ | 3 | 4 | 5 | $\bar{1}$ | $\bar{2}$ | 3 | $\bar{4}$ | 5 | 1 | 2 | 3 | 4 | 5 |
| 7 | 1 | 2 | $\bar{3}$ | $\bar{4}$ | $\bar{5}$ | 1 | $\bar{2}$ | 3 | 4 | 5 | 1 | $\bar{2}$ | $\bar{3}$ | $\bar{4}$ | $\bar{5}$ |
| 8 | $\bar{1}$ | $\bar{2}$ | 3 | 4 | 5 | 1 | $\bar{2}$ | 3 | $\bar{4}$ | 5 | $\bar{1}$ | $\bar{2}$ | 3 | 4 | 5 |
| 9 | 1 | 2 | 3 | 4 | 5 | 1 | $\bar{2}$ | 3 | $\bar{4}$ | $\bar{5}$ | 1 | 2 | 3 | $\bar{4}$ | $\bar{5}$ |
| 0 | 1 | 2 | 3 | 4 | 5 | 1 | 2 | $\bar{3}$ | 4 | 5 | 1 | 2 | 3 | 4 | 5 |

Comparing FIG. 5 and table I it is to be noted that the uniqueness of the hole positions of the digits differ in each case. For example, comparing the decimal digits 9 and 0 in the registration position I or line I each of the hole positions H1 through H5 read the same, namely, 1, 2, 3, 4, 5 indicating that all of the circles in FIG. 5 representing the hole positions H1 through H5 lie on the type font or in a darkness or lower intensity light area. However, in digit registration position II, the comparative readings for the decimal digits 9 and 0, as indicated in table I and FIG. 5, show the sequence to be for digit 9:1, $\bar{2}$, 3, $\bar{4}$, $\bar{5}$ whereas for the decimal digit 0 the hole sequence is represented by 1, 2, 3, 4, and 5. Also, as indicated at registration line III for the decimal digit 9 the holes are represented in table I by the sequence 1, 2, 3, $\bar{4}$, $\bar{5}$ while for the same digit registration line the decimal digit 0 is represented by the sequence of holes 1, 2, 3, 4, and 5. Thus, the bar represents the presence of light while the absence of a bar represents darkness or lower intensity light.

In FIG. 4 there is illustrated, among other things, in block diagram form the details of the logic circuitry 26 (FIG. 1) for "reading" the particular decimal digit being focused at three different positions (Roman numbers I, II and III) projected onto and through the mask 20. As indicated in FIG. 4, six photodetector elements 22a through 22f are each registered against their respective holes, H1 through H6 in mask 20. Output signals from these photodetectors 22a through 22f are fed to the inputs of their respective amplifiers 24a through 24f.

The card holder 17 carrying the credit card 16 moves the card as indicated in FIG. 1 such that one-third of each of the decimal digits is moved into the field of view, thereby allowing each decimal digit to be read at the digit registration lines I, II and III. As indicated hereinafter with reference to discussion of the holder, per se, the registration lines appearing thereon are directed to the hole H6 to energize the photodetector 22f. The output from amplifier 24f triggers the gating circuitry appropriately in the manner hereinafter discussed.

For example, consider that the card 16 is moved by the holder 17 past the lens 18 such that the first registration line, or position I is detected by the photodetector 22f through hole H6 and that the decimal digit on the credit card is the decimal 3, 4, and 5.

Thus, hole H6, its photodetector 22f and amplifier 24f control the gating circuitry 40 in such manner that each of the registers I, II, and III filled in sequence. Such functioning is the familiar serial-to-parallel conversion. As suggested in FIG. 4 the five bits, or signals, from register I are delivered directly to a decode matrix I. Similarly, the five bits, or signals, in register II are delivered to a decode matrix II. Also, the five bits, or signals, stored in register III are delivered to a decode matrix III. The aforementioned decode matrices I, II, and III convert the data in the registers I, II, and III to decimal data. As indicated, each decode matrix I, II and III provides 10 outputs, the outputs being representative of the decimal digits 0 through 9. As indicated, the various outputs 0 through 9, representative of these decimal digits are labeled as such on the outputs of the decode matrices I, II and III.

As indicated in FIG. 4 for each of the decimal digit outputs 0 through 9 for the three decode matrices I, II and III there is provided three AND gates A, B and C and an OR gate. For example, for the decimal digit output 0 the OR gate is designated OR-0 while for the decimal digit output 9 from the three decode matrices the OR gate is designated as OR-9. In FIG. 4 (for purposes of clarity) only the decimal digit outputs 0 and 9 from the decode matrices I, II and III are shown as being connected with their respective AND gates A, B and C and their respective OR gates OR-0 and OR-9. As shown, the outputs representative of the decimal digit 0 from the decode matrices are delivered to the AND gates A, B, C and the OR gate OR-0 in the following manner. The AND gate A accepts the 0 signal from decode matrices I and II. The AND gate B accepts as inputs the 0 signal from decode matrices I and III, while the AND gate C represents 0 signals from the decode matrices II and III. Outputs from the AND gates A, B and C are delivered as inputs to OR gate OR-0. Similarly, for the signal outputs representative of the decimal digits 9 from the decode matrices I, II and III the AND gate A accepts as inputs the 9 signal from decode matrices I and II. Also, AND gate B accepts as input signals the 9 signals from decode matrices I and III while the AND gate C accepts as input signals the 9 signal from decode matrices II and III. Similarly, the outputs from these AND gates A, B and C are delivered to an OR gate OR-9. A similar procedure is followed for the decimal digits 1 through 8, not shown in FIG. 4. As suggested there are 10 sets of the three AND gates A, B and C and a particular OR gate for each of the 10 decimal digits.

Majority logic is employed as can be seen by the arrangement of the AND gates A, B, and C in conjunction with the OR gates and the decimal digit signals representative of the signals 0 through 9 from each of the decode matrices, I, II and III. Thus, AND gate A for each of the digits provides an output if two of the three sets of bits delivered to the decode matrices from its respective register are in agreement. Thus, for example, AND gate A will provide an output signal to its driven OR gate if the signals, or bits, in registration lines I and II or register I and II are in agreement. Similarly, AND gate B delivers an output if registers II and III are in agreement. Likewise, AND gate C delivers a signal to its driven OR gate if the bits in registers II and III are in agreement. These bits in the registers I, II and III are as indicated in table I.

As suggested by the connections of the particular AND gates, A, B and C and their associated OR gate, if two or more of the registers I, II and III are in agreement as to the bits which they contain representative of the particular decimal digit being read, the particular OR gate is actuated to provide an output signal representative of the digit being read. Only one of the OR gates OR-0 through OR-9 will produce an output signal and as indicated the particular signal representative of the decimal digit is delivered to a binary encoder 28, so that ultimately all of the 10 of the decimal digits on the credit card are ultimately delivered from the binary encoder to a comparator unit. From there on the action is as described with reference to FIG. 1.

FIGS. 7 through 12 illustrate the manner in which the credit card 16 is inserted into its holder 17. FIG. 7 shows credit card 16 in an upside-down position. That is the way in which it is to be inserted into the card holder 17 shown in FIG. 8. In FIGS. 8 and 9 the holder per se is illustrated. As shown the holder 17 is essentially comprised of a backplate 50 having, as shown in FIG. 8, pairs of studs 50a located at the top and bottom portions of said backplate 50. The holder 17 also includes a front plate 51 which as indicated is comprised of a relatively thin sheet of spring steel. As shown in FIG. 8 the relatively thin front plate No. 51 is provided with a number of cutouts 51a. These cutouts 51a are formed between the times or tongues 51b.

FIG. 12 is a cross section view through the section line 12—12 tine of FIG. 10 showing the credit card 16 within the holder 17. It has been discovered that each of the numerals or characters 0 through 9 has substantially the same width and thus the spacing or slots 51a between the tines 51b accommodate substantially exactly the width of the embossed characters or groups of them as shown. Thus each of the embossed numerals comprising the credit card account number are held in registration for purposes of accurate recognition by the optics system shown in FIG. 1.

As shown in FIGS. 8 and 10 there is mounted on the front plate 51 underneath the various numerals three registration marks I, II and III. Each of the embossed digits representing the account number is as stated hereinbefore read at or recognized at three different indices or registration lines I, II and III. Note as shown in FIG. 12 that the embossed digits protrude beyond the front plate 51. The protruding embossed digit is identified in FIG. 12 by the reference letter D.

As shown in FIG. 11 the holder 17 having the card 16 inserted therein is slidable on the upper and lower tracks 53 and 54. The studs 50a on the uppermost and lowermost portions of the backplate 50 slide within the slotted tracks 53 and 54 as indicated. The holder having the card 16 therein is moved against the restraining force of a piston 55 which in turn moves against the column of air within the cylinder 56. The piston 55 and air cylinder 56 provide a restraining dashpot arrangement.

By moving the holder 17 and its carried card 16 against the restraint of the aforementioned dashpot the optical system, which is able to read in the order of milliseconds, is constrained by the motion in such time lapse to be compatible with the time lapse in the optical system.

As shown in FIGS. 7 and 10 the credit card having the embossed account number the name thereon is inserted upside down into the holder so that the embossed digits may fit into the slots 51a in the manner shown and further that the embossed protuberances do not interfere with insertion of the card into the holder 17.

While a specific embodiment of the invention has been shown and described in detail to illustrate the application of the inventive principles involved it is to be understood that the invention may be otherwise embodied without departing from the spirit and scope of the invention as hereinafter defined in the appended claims.

What is claimed is:

1. Apparatus for verifying the credit of a particular account wherein said account is evidenced by presentation of a credit card having a plurality of embossed decimal digits representing the account number and wherein each embossed decimal digit is a raised portion extending from the plane of the card, comprising: a holder adapted to receive and hold the credit card, said holder including a backplate and a relatively thin front plate fastened to an edge of an overlying said backplate and exerting pressure on a face thereof but, nevertheless, allowing for insertion of the credit card between the backplate and the front plate whereby said credit card is held under pressure contact between said back and front plates, said front plate being cut away so as to form a plurality of tongues therein which are disposed in parallel relationship with respect to each other and thereby providing spaces between adjacent tongues, said spaces extending serially across the face of the front plate and exposing the backplate when the credit card is not being held between said plates, the raised embossed portions, representing the digits, protruding into said spaces between the tongues and being visible together with said front plate when said card is being held between the plates, the edges of the protruding raised portion of the embossed digits abutting the edges of the adjacent tongues whereby the embossed digits are maintained in accurate optical registration; means for directing light onto the credit card and illuminating the embossed digits thereon; means for moving said holder and the inserted credit card with respect to said light direction means and illuminating means; means for focusing light reflected from the embossed digit; a mask for receiving the reflected light from said focusing means, said mask having a set of apertures therethrough for receiving the reflected light from the focusing means, said set of apertures in said mask being comprised of 15 separate apertures arranged in three vertical columns ad five horizontal rows, said holder and card inserted therein being movable in the presence of the light directing means whereby the focusing means directs reflected light from each embossed digit one at a time as said holder is moved past the focusing means onto the mask and wherein the light so reflected passes through selected ones of said 15 apertures depending on which one of the embossed digits, 0 through 9, is reflecting light, each of the embossed decimal digits, 0 through 9, uniquely reflecting lights as they move past the focusing means so that the reflected light passes through different apertures through the mask; means for generating set of signals at each aperture in the mask from each of the embossed digits to the focused reflected light in response to the focused reflected light on said apertures, each generated set of signals being representative of an individual one of said decal digits; encoding said set of signals in binary form; and, comparing said binary signals with other binary signals representing a plurality of stored account numbers in order to verify the credit of the account represented by the decimal digits of the credit card.

2. The apparatus according to claim 1 comprising restraining means operatively associated with said holder for restraining the motion of said holder to a relatively low speed whereby each embossed decimal digit may dwell long enough in the presence of the light directing means so that the reflected light passes through the focusing means to the apertures in said mask.